United States Patent
Kalevo et al.

(10) Patent No.: US 9,813,607 B2
(45) Date of Patent: Nov. 7, 2017

(54) METHOD AND APPARATUS FOR IMAGE CAPTURE TARGETING

(75) Inventors: Ossi Kalevo, Toijala (FI); Riku Suomela, Espoo (FI)

(73) Assignee: Nokia Technologies Oy, Espoo (FI)

( * ) Notice: Subject to any disclaimer, the term of this patent is extended or adjusted under 35 U.S.C. 154(b) by 338 days.

(21) Appl. No.: 14/360,093

(22) PCT Filed: Dec. 16, 2011

(86) PCT No.: PCT/FI2011/051121
§ 371 (c)(1),
(2), (4) Date: May 22, 2014

(87) PCT Pub. No.: WO2013/087974
PCT Pub. Date: Jun. 20, 2013

(65) Prior Publication Data
US 2014/0320668 A1    Oct. 30, 2014

(51) Int. Cl.
*H04N 5/232* (2006.01)

(52) U.S. Cl.
CPC ..... *H04N 5/23212* (2013.01); *H04N 5/23222* (2013.01); *H04N 5/23296* (2013.01); *H04N 5/23219* (2013.01)

(58) Field of Classification Search
None
See application file for complete search history.

(56) References Cited

U.S. PATENT DOCUMENTS

| | | | |
|---|---|---|---|
| 5,877,809 A | 3/1999 | Omata et al. | |
| 6,466,205 B2 | 10/2002 | Simpson et al. | |
| 8,514,491 B2 * | 8/2013 | Duparre | H01L 27/14621 359/443 |
| 8,619,082 B1 * | 12/2013 | Ciurea | H04N 13/0022 345/427 |
| 8,866,920 B2 * | 10/2014 | Venkataraman | H04N 5/2253 348/218.1 |

(Continued)

FOREIGN PATENT DOCUMENTS

| | | |
|---|---|---|
| CN | 101166234 | 4/2008 |
| CN | 101873882 | 10/2010 |

(Continued)

OTHER PUBLICATIONS

Pan, Jiyan, Bo Hu, and Jian Qiu Zhang. "Robust and accurate object tracking under various types of occlusions." Circuits and Systems for Video Technology, IEEE Transactions on 18.2 (2008): 223-236.*
Javed, Omar, and Mubarak Shah. "Tracking and object classification for automated surveillance." Computer Vision—ECCV 2002. Springer Berlin Heidelberg, 2002. 343-357.*

(Continued)

*Primary Examiner* — Mohammad J Rahman
(74) *Attorney, Agent, or Firm* — Locke Lord LLP (57) ABSTRACT

In accordance with an example embodiment of the present invention, a method and corresponding apparatus and computer program are disclosed for: receiving images from an image sensor of a camera unit (505); monitoring locations of different objects in the received images (510); determining which if any of the different objects is a primary object that is or should be of interest to a user (515); and detecting if any primary object becomes occluded by another one of the different objects and responsively to detection of such occlusion triggering a first action (520).

19 Claims, 3 Drawing Sheets

(56) References Cited

U.S. PATENT DOCUMENTS

| | | | |
|---|---|---|---|
| 8,933,889 B2* | 1/2015 | Heikkinen | A63F 13/10 345/169 |
| 2001/0052899 A1* | 12/2001 | Simpson | G06T 7/00 345/419 |
| 2007/0024527 A1* | 2/2007 | Heikkinen | A63F 13/10 345/9 |
| 2007/0115363 A1 | 5/2007 | Nakamura | |
| 2007/0201726 A1 | 8/2007 | Steinberg et al. | |
| 2008/0169998 A1* | 7/2008 | Jacobsen | G02B 27/0172 345/8 |
| 2008/0266419 A1 | 10/2008 | Drimbarean et al. | |
| 2009/0110239 A1* | 4/2009 | Chen | G06T 15/205 382/103 |
| 2009/0268074 A1 | 10/2009 | Sugino | |
| 2010/0045800 A1* | 2/2010 | Chebil | G03B 13/36 348/169 |
| 2010/0238161 A1* | 9/2010 | Varga | G06T 17/05 345/419 |
| 2010/0240988 A1* | 9/2010 | Varga | G02B 27/017 600/425 |
| 2011/0273471 A1 | 11/2011 | Nagasaka et al. | |
| 2012/0062787 A1* | 3/2012 | Muijs | G06T 5/003 348/345 |

FOREIGN PATENT DOCUMENTS

| | | |
|---|---|---|
| EP | 2056256 | 5/2009 |
| JP | 2005003852 | 1/2005 |
| JP | 2010004381 | 1/2010 |
| JP | 2010098354 | 4/2010 |
| JP | 2010154287 | 7/2010 |
| JP | 2011023898 | 2/2011 |

OTHER PUBLICATIONS

Landabaso, Jose-Luis, Li-Qun Xu, and Montse Pardas. "Robust tracking and object classification towards automated video surveillance." Image Analysis and Recognition. Springer Berlin Heidelberg, 2004. 463-470.*

Extended European Search Report for EP Application No. 11877277.1-1502, dated Sep. 28, 2015, 6 pages.

English Language Abstract of Chinese Patent Application Publication No. CN101873882, 1 page.

English Language Abstract of Chinese Patent Application Publication No. CN101166234, 1 page.

English Language Machine Translation of Chinese Patent Application Publication No. CN101873882, 12 pages.

English Language Machine Translation of Chinese Patent Application Publication No. CN101166234, 8 pages.

Search Report of Chinese Patent Application No. 2011800755241, dated Oct. 27, 2015, 2 pages.

International Search Report for International Application No. PCT/FI2011/051121—dated Sep. 17, 2012—6 pages.

PCT Written Opinion of the International Searching Authority for International Application No. PCT/FI2011/051121—dated Sep. 17, 2012—8 pages.

English Language Machine Translation of Japanese Patent Publication No. JP2005003852—19 pages.

English Language Machine Translation of Japanese Patent Publication No. JP2010004381—40 pages.

English Language Machine Translation of Japanese Patent Publication No. JP2010098354—14 pages.

English Language Machine Translation of Japanese Patent Publication No. JP2010154287—23 pages.

English Language Machine Translation of Japanese Patent Publication No. JP2011023898—53 pages.

* cited by examiner

METHOD AND APPARATUS FOR IMAGE CAPTURE TARGETING

TECHNICAL FIELD

The present application generally relates to image capture targeting.

BACKGROUND

In digital photographing, an image of a field of view is drawn on a camera sensor that forms a digital image. For concentrating light on the camera sensor, an objective is used as known from camera systems. An impression of depth in the picture can be obtained by producing a restricted accurate field of depth. Objects closer or farther than so-called focal plane appear increasingly blurred, which enables highlighting desired objects. Auto-focus enables a camera to maintain selected objects of interest in focus when the distance between the camera and the objects changes or if the focal length of the objective is changed by zooming in or out.

For autofocus, the camera needs to know which parts of the image should be focused. To this end, the auto-focus may employ face detection or other algorithms to find likely interesting targets. At simplest, the user identifies the target point by aiming a single focusing point towards the desired object e.g. by pressing a trigger button halfway down to lock the focus and then turns the camera to frame the image in some other way, if necessary. In some enhanced cameras, the auto-focus is configured to track the object of interest and maintain focusing on it even when the object travels. Such tracking auto-focus, also known as AI servo or continuous focusing, is useful when taking pictures of flying birds, for instance.

SUMMARY

Various aspects of examples of the invention are set out in the claims.

According to a first example aspect of the present invention, there is provided an apparatus comprising:
an input for receiving images from an image sensor of a camera unit;
a processor configured to:
monitor locations of different objects in the received images;
determine which if any of the different objects is a primary object that is or should be of interest to a user;
detect if any primary object becomes occluded by another one of the different objects and responsively to detection of such occlusion to trigger a first action.

The apparatus may further comprise an output.

The first action may be issuing an occlusion detection signal through the output. The processor may be further configured to determine how much the camera should be moved laterally to avoid the occlusion. The first action may further or alternatively comprise issuing a movement signal indicative of a direction to which the camera should be moved to avoid the occlusion. The movement signal may further comprise a determination of how much the camera should be moved. The issuing of a movement signal may be subject to the determination of how much the camera should be moved so that the movement signal is issued only if a movement smaller than a given threshold is determined necessary.

The first action may be starting of continuous shooting mode. The processor may be further configured, during the continuous shooting mode started as the first action, to detect and automatically reject some or all of the images in which the occlusion is present.

The first action may be delaying image capture. The image capture may be delayed at most by a given maximum period. The maximum period may be 0.5 to 3 seconds. The maximum period may be fixed. Alternatively, the maximum period may be dynamically defined depending on one or more factors. The factors may comprise one or more of the following: relative speed of the occluded primary object and of an occluding object; whether other images have already been taken where the occluded primary object was captured; sharpness of earlier image or images where the presently the occluded primary object was visible; estimated exposure period; whether a flash unit is used and if so, optionally also the possible flash rate of the flash unit.

The input may be further configured to receive object information from an auto-focus unit. The object information may comprise depth information. The processor may be configured to use the received object information as a basis for the monitoring of the different objects in the received images.

The monitoring of the locations the different objects may comprise determining the position of the different objects in lateral direction. The monitoring of the locations the different objects may also involve determining the position of the different objects along the axis extending between the camera unit and the objects i.e. in depth. The processor may be configured to determine depth of an object by face detection and by calculating the scale of at least one facial feature in the image. The at least one facial feature may comprise two or more points formed by eyes, ears, mouth, eyebrows, tip of the jaw, and/or the size of the head. Based on typical dimension of the facial feature in question, the processor may be configured to estimate the range between the camera unit and a person who appears as one of the different objects in the image.

The processor may be configured to perform time of flight based depth mapping. The processor may be configured to calculate the time of flight based on known timing of illumination and of the image sensor.

The processor may be configured to skip determination of primary objects and detection of occlusion if only one object is identified in the received images.

The processor may be configured to detect different objects in the received images. For detecting of the different objects, the processor may be configured to cause the camera unit to: change focusing over entire or most of available focusing range, take images at different focusing, and determine objects at different distances based on how different parts of the images become focused and/or unfocused while the focusing is changed. Alternatively or additionally, the processor may be configured to receive a depth map from the camera unit and use the depth map in determination of the different objects. The depth map may originate from the auto-focus unit. The processor may be configured to cause identifying of the detected different objects on a viewfinder. The processor may be further configured to receive a user selection of one or more of the objects identified on the viewfinder. The identifying may comprise visual highlighting of an object on the display. The highlighting may comprise drawing a frame around an object; changing colours of an object; changing brightness and/or contrast of an object; or any combination thereof. Alternatively or additionally, the identifying of the detected different objects may comprise separately presenting the detected different objects.

The processor may be configured to employ colours for the monitoring of the locations the different objects in the received images.

According to a second example aspect of the present invention there is provided a method comprising:
receiving images from an image sensor of a camera unit;
monitoring locations of different objects in the received images;
determining which if any of the different objects is a primary object that is or should be of interest to a user; and
detecting if any primary object becomes occluded by another one of the different objects and responsively to detection of such occlusion triggering a first action.

According to a third example aspect of the present invention there is provided an apparatus configured to perform the method of the second or fifth example aspect.

The apparatus may comprise a memory storing computer program code and a processor configured to control operation of the apparatus based on the computer program code.

According to a fourth example aspect of the present invention there is provided a computer program comprising program code that when executed by a processor causes the processor to cause performing of the method of the second example aspect.

The memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferro-electric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
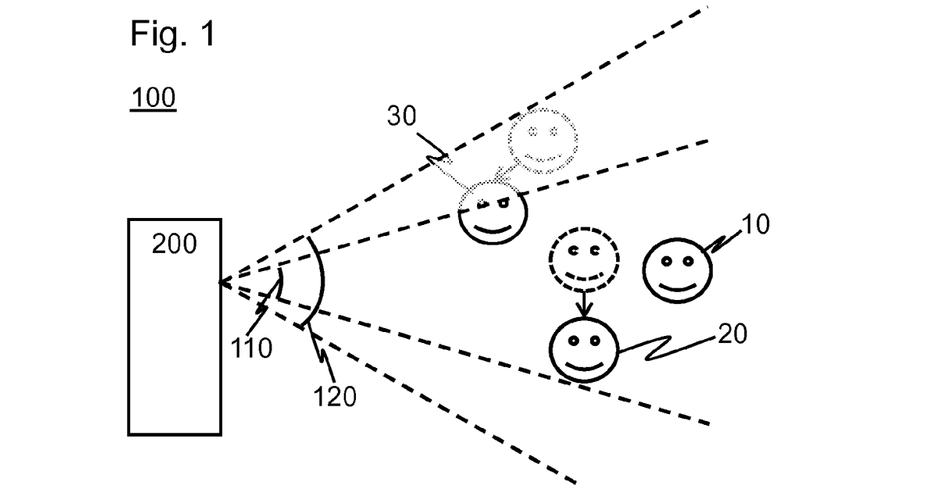
FIG. 1 shows an architectural overview of a system of an example embodiment of the invention.

FIG. 1 shows an architectural overview of a system 100 of an example embodiment of the invention. The system comprises an apparatus 200 with a camera unit (260 in FIG. 2) having a first field of view 110 and a second field of view 120. The first field of view 110 is a primary field of view and also presented to the user of the apparatus 200 on a viewfinder (270 in FIG. 2) of the apparatus 200. The second field of view is provided by an example embodiment in which the camera unit has far greater resolution and field of view than that used for current imaging; this embodiment will be described in further detail nearer to the end of this document. For convenience, the first field of view 110 is next referred to as the view 110.

In different embodiments, the apparatus 200 is or comprises one or more of the following: a mobile device, handheld device, mobile phone, digital camera, personal digital assistant, gaming device, handheld gaming device, navigation device and vehicle based user device.

In the view 110, there are first and second imaging objects 10, 20 drawn as smiling faces. The second imaging object 20 is moving and its earlier location is shown by a hash line. Partly in the view there is also a third imaging object 30 that is moving obliquely with relation to the view 110. In the present locations, none of the first to third imaging objects is occluded by other objects. In other words, each imaging object is fully visible to the camera unit 260 of the apparatus 200, although naturally only from the side towards the apparatus 200. However, in its earlier location, the second imaging object 20 was occluding the first imaging object 10 (assuming the objects occupy common planes in the direction against the plane of the drawing). The occlusion of one or more imaging objects is a situation that easily arises e.g. when photographing a group of people or animals, and the more likely the more image objects there are in the image. The term image object refers to an object that appears in the image such as an aeroplane, a dog or head of a person. It is understood that normally, the background of the image may contain various objects such as peaks of mountains or pieces of furniture. In some occasions, different parts of one physical objects form separate image objects. For instance, a hand of a person may occlude her face in which case the hand and head are treated as separate image objects. Different image objects may be seen as such image parts that are distinguishable by the processor 210 or that are defined by the user.

Figure 2:
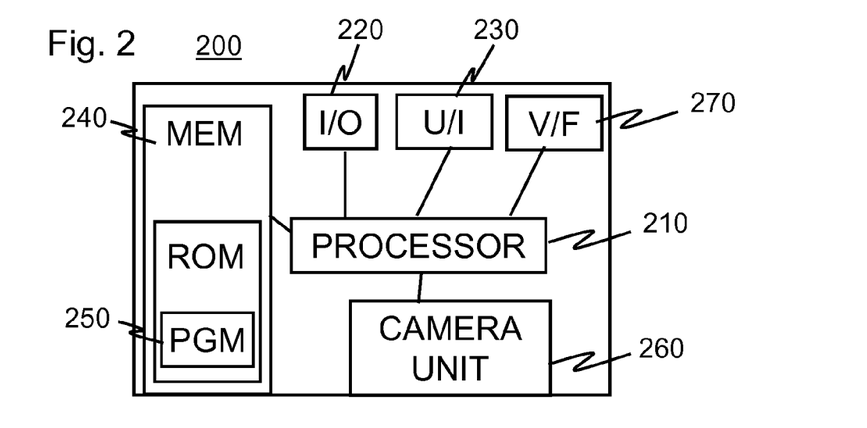
FIG. 2 shows a block diagram of an apparatus of an example embodiment of the invention.

FIG. 2 shows a block diagram of an apparatus 200 of an example embodiment of the invention. The apparatus 200 comprises a communication interface 220, a processor 210 coupled to the communication interface module 220, and a memory 240 coupled to the processor 210. The memory 240 comprises a work memory and a non-volatile memory such as a read-only memory, flash memory, optical or magnetic memory. In the memory 240, typically at least initially in the non-volatile memory, there is stored software 250 operable to be loaded into and executed by the processor 210. The software 250 may comprise one or more software modules and can be in the form of a computer program product that is software stored in a memory medium. The apparatus 200 further comprises a camera unit 260 and a viewfinder 270 each coupled to the processor.

It shall be understood that any coupling in this document refers to functional or operational coupling; there may be intervening components or circuitries in between coupled elements.

The communication interface module 220 is configured to provide local communications over one or more local links. The links may be wired and/or wireless links. The communication interface 220 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 220 may be integrated into the apparatus 200 or into an adapter, card or the like that may be inserted into a suitable slot or port of the apparatus 200. While FIG. 2 shows one communication interface 220, the apparatus may comprise a plurality of communication interfaces 220.

The processor 210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 210, but the apparatus 200 may comprise a plurality of processors.

As mentioned in the foregoing, the memory 240 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 200. Moreover, in some example embodiments, the apparatus comprises a plurality of memories. In some example embodiments, various elements are integrated. For instance, the memory 240 can be constructed as a part of the apparatus 200 or inserted into a slot, port, or the like. Further still, the memory 240 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus when external power if external power supply is not available.

It is also useful to realise that the term apparatus is used in this document with varying scope. In some of the broader claims and examples, the apparatus may refer to only a subset of the features presented in FIG. 2 or even be implemented without any one of the features of FIG. 2. In one example embodiment term apparatus refers to the processor 210, an input line of the processor 210 configured to receive information from the camera unit and an output line of the processor 210 configured to provide information to the viewfinder.

Figure 3:
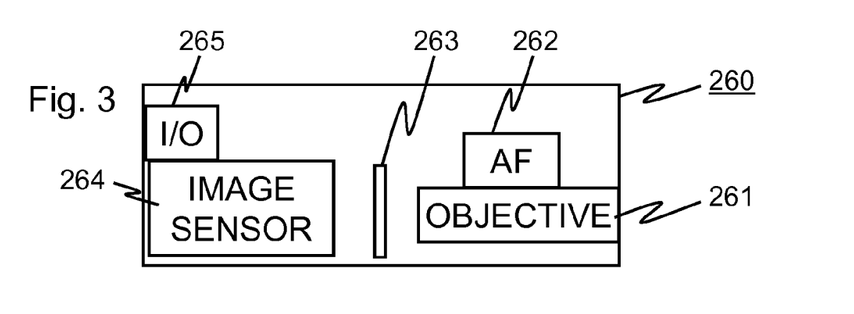
FIG. 3 shows a block diagram of a camera unit of an example embodiment of the invention.

FIG. 3 shows a block diagram of a camera unit 260 of an example embodiment of the invention. The camera unit 260 comprises an objective 261, an autofocus unit 262 configured to adjust focusing of the objective 261, an optional mechanical shutter 263, an image sensor 264 and an input and/or output 265. The camera unit 260 is configured in one example embodiment to output autofocus information from the autofocus unit 262. In one example embodiment, the camera unit is also configured to receive through the I/O 265 instructions for the autofocus unit 262.

Figure 4:
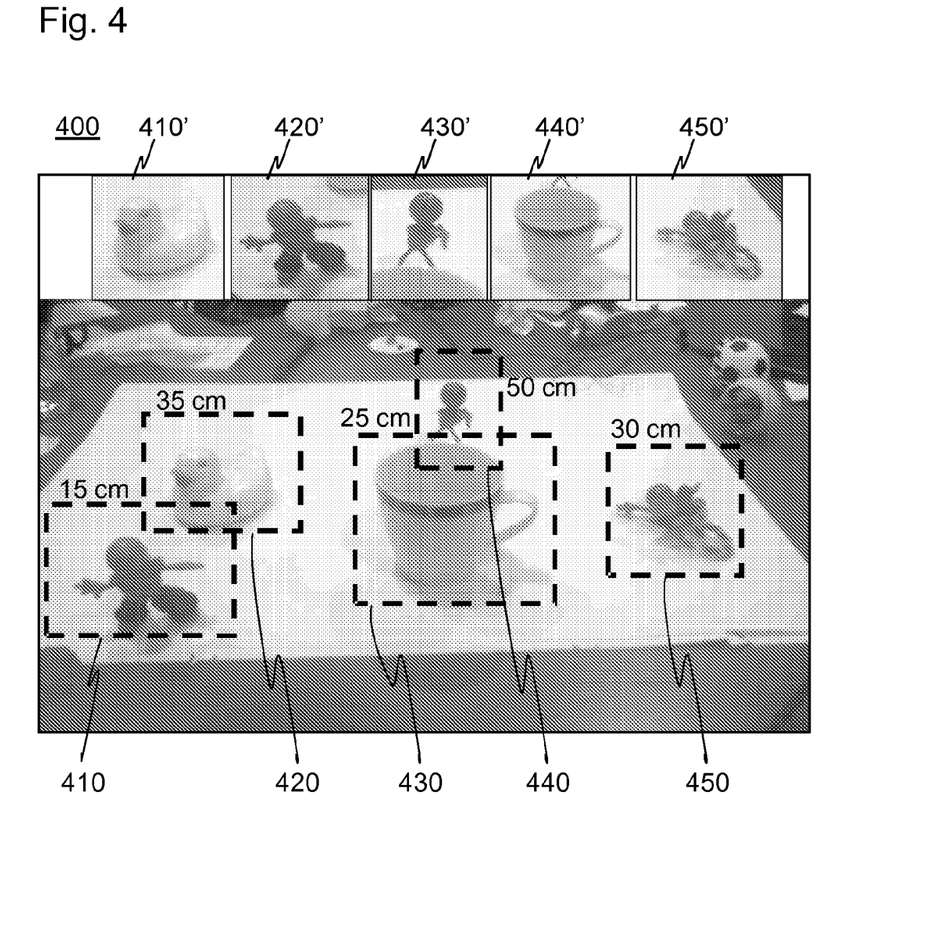
FIG. 4 shows an example viewfinder view of an example embodiment of the invention.

FIG. 4 shows an example viewfinder view 400 of an example embodiment of the invention. On the viewfinder, there are two windows or panes: a main window presents live camera image view (of the first view 110 in this example) while an object window presents detected image objects. In one example embodiment, the object window is only presented when at least one object is detected. In the main window, the camera image is presented, here of showing various items on a desk. Among various items in the image, five objects (first object to fifth object 410 to 450) are detected as potential objects of interest. In should be realised that FIG. 4 is solely an illustrative setting and therefore some items at peripheral region of the image are not identified as potential objects of interest. Also corresponding icons or possibly downscaled image objects 410' to 450' are shown in the object window. In an example embodiment, the viewfinder is presented on a touch screen. A user can toggle objects "on" or "off" for treatment as image objects of interest. In one example embodiment, the user is allowed to select desired one or more image objects by pointing at respective part of the screen so that the apparatus 200 identifies boundaries or frames the selected image object. In another example embodiment, the user is allowed to manually frame a desired image object by drawing a box around it, for instance.

FIG. 4 present rectangle shape image objects. Also other shapes are possible in other example embodiments. For instance, the shape of the image object may be dynamically adapted to conform to the shape of the image object itself. For instance, if the cup were selected, a region of the shape of the cup can be defined for this image object.

Figure 5:
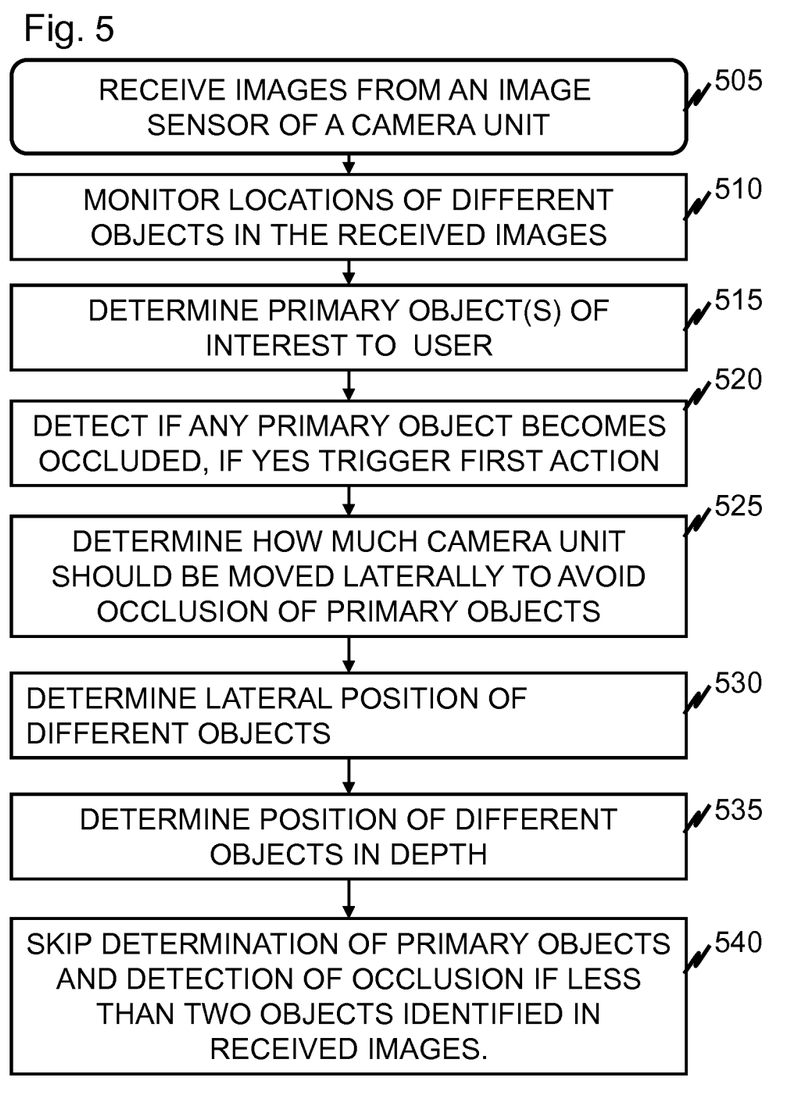
FIG. 5 shows a flowchart of a process of an example embodiment of the invention.

FIG. 5 shows a flowchart of a process of an example embodiment of the invention that illustrates various possible features. Some or all of the steps shown in FIG. 5 are performed by a processor such as the processor 210 of the apparatus 200. It should be understood that despite the drawing of the arrows from one box to another in FIG. 5, the different steps need not be performed in the order in which they appear in FIG. 5.

In step 505, images are received from an image sensor of a camera unit. Locations of the different objects in the received images are monitored 510. Primary object(s) of interest to the user are determined 515. In step 520 it is detected if any primary object becomes occluded, and if yes, first action is triggered. It is determined 525 how much the camera unit should be moved laterally to avoid occlusion of the detected primary objects. Lateral positions of different objects are determined 530. Positions of different objects in depth are determined 535 e.g. based on one or more of the different methods disclosed in this document. The determination of primary objects 515 and the detection of occlusion 520 can be skipped if less than two objects are identified in received images.

New Image Capture and Reliving Experience System

In one example aspect, a new kind of capture and reliving experience system is developed that enables to capture the scene and moments with high quality relevant pictures and videos within one device and by one user. The captured information contains multiple images and/or multiple videos that are recorded simultaneously and can contain information from objects that are separate or can overlap within each others. Depth information enables simple distinguishing or detection of different objects. The captured/recorded information, possibly separately of each image object, is also easy to edit, reduce or relive again, because the information is well organized.

In addition to 2D image and video systems, 3D experience can also be improved by utilizing the information from one camera system also within the other camera system/systems. Some further examples illustrative of some implementations of the invention are discussed in the following.

One example image capture process has the following steps:

1. Obtain a depth map with the camera. In one example embodiment, the depth map is produced by the processor based on time of flight of light from the apparatus to the image objects and back to the apparatus. The time of flight may be determined using the camera sensor. In another example embodiment, 3D imaging is used to create the depth map.
2. Using the depth map, identify objects of an image either manually from the viewfinder (user selected) or automatically (based on algorithms such as face recognition).
3. When objects are identified, define an area (rectangle or free form) around the object that is being marked as an object of interest (See FIG. 4).
4. Start monitoring or tracking of objects of interest and optionally identify the objects of interest on the viewfinder (FIG. 4).
5. Detect occlusion of identified objects or optionally abstain from the detecting of occlusion if no image objects are identified or if only one image object is identified, that is if less than two image objects are identified.
6. Trigger one or more actions when the user commands the apparatus to take a photo e.g. by pressing a trigger. The actions may involve:
   a. generating a single photo of the full screen;
   b. taking a full photo i.e. an image of a full resolution which uses all the pixels the camera sensor provides in an image (possibly excluding margins used for digital image stabilisation) and separate photos of objects of interests (build a photo gallery from a single photo large resolution image);
   c. taking a full-screen photo with the large or down-sampled resolution and videos of objects of interest;
   d. taking any other combination of photos and/or videos such as a large parent photo with multiple child objects;
   e. record earlier captured images and/or image streams such as series of still images or video footage;
   g. initiate continuous shooting of still images;
   h. extract sub-images of objects of interest in taken still images while rejecting other parts or storing the other parts with lower resolution than the images of the image objects of interest.

An example of post processing/editing of captured images comprises:

1. User is allowed to view the content. Each image contains a set of objects, and images taken close to each other define a photo-set in time. For each photo-set the user is allowed to watch at the images/videos based on:
   a. people/object
   b. parent image+child images
   c. parent images+video added on top of that
   d. video inside a video (a video of object 1, containing video of object 2)
   e. and any other combination of these
2. Enhanced processing such as disposal and storage of numerous images and videos by associated features provided e.g. as instant shortcuts. The associated features may include:
   a. Delete;
   b. Tag; and/or
   c. Create collections;

Various types of equipment are usable for implementing different example embodiments. System requirements and features of some examples involve one or more of the following:

image capture unit such as image sensor has sufficient resolution (e.g. 10 to 200 Mpixels, typically 20 to 50 Mpixels) to enable high quality capture of multiple images and/or videos;

camera architecture provides for multiple individual image streams selecting, scaling or down-sampling and processing in real time;

support for selection of recorded objects automatically and/or by a user selection (e.g. touch, gesture);

support for tracking and video capturing of selected objects are during the tracking (notice: video and image stabilization can be provided based on the larger background field of view as illustrated by second field of view 120 in FIG. 1 or based on the image objects seen recorded by the camera sensor);

support for producing depth maps or measuring distances of the objects are measured, and optionally for showing depth maps in the viewfinder during the recording and/or during playback of the images and/or videos;

ability to record individual pictures of the objects and the full scene every time the user indicates capture moment (note: also time shift feature (images with timing from t−n, . . . , t, . . . t+m are recorded) can be used to enable better capture of the right moment or enhanced playback experience). In one example embodiment, some or all of the images recorded in anticipation of the user issuing an image taking command are rejected if occlusion is detected;

ability to record video of selected objects continuously (notice: only image objects of interest may be selectively video recorded while all detected or identified image objects are being tracked);

ability to notify e.g. occlusions;

ability to propose new camera positions in which the occlusion would be reduced or coming occlusion be avoided when taking into account mutual motion of the image objects;

ability to create optimized capture (picture collage) from the recorded images;

ability to show a viewfinder with full scene and selected object/objects or vice versa;

ability to scale pictures properly for video recordings, viewfinder and still captures without recording all the time full resolution and high frequency video or images;

ability to show different photo sequences, video in photo, video in video, and also other different presentations or animations (e.g. similar as viewfinder view or fly through animation);

in case of a 3D camera unit, ability to transfer tracking information of different objects from one camera unit to another.

Without in any way limiting the scope, interpretation, or application of the claims appearing below, a technical effect of one or more of the example embodiments disclosed herein is that occlusion of image objects of interest to the user may be automatically detected. Another technical effect of one or more of the example embodiments disclosed herein is the detection of an occlusion may be employed to control operation of a camera so that adverse effects of the occlusion are mitigated. Another technical effect of one or more of the example embodiments disclosed herein is that detection of image objects may be used for two or more of: auto-focus, detection of occlusion and producing of separate images or videos representative of individual image objects of interest to the user. Another technical effect of one or more of the example embodiments disclosed herein involve ability to create new imaging experience both for capturing and reliving; more relevant information can be recorded from the same moment and scene; more high quality images of the objects can be recorded more easily; inexpensive equipment can be used without necessarily requiring multiple devices and/or multiple users; usability as an automatic party camera or enhanced surveillance camera; and/or that only cropped areas may need to be processed with full resolution and with all corrections.

In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2 as the apparatus 200. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
an input for receiving images from an image sensor of a camera unit;
a processor configured to:
monitor locations of different objects in the received images, wherein the monitoring of locations of different objects involves determining a position of the different objects along an axis extending between the camera unit and the different objects;
determine which if any of the different objects is a primary object that is or should be of interest to a user; and
detect if any primary object becomes occluded by another one of the different objects and responsively to detection of such occlusion to trigger a first action,
wherein the processor is further configured to determine, using the determined position of different objects along the axis extending between the camera unit and the different objects, how much the camera unit should be moved laterally to avoid occlusion of primary objects, and
wherein the first action comprises issuing a movement signal indicative of a direction to which, and how much, the camera unit should be moved laterally to avoid the occlusion.

2. The apparatus of claim 1, wherein the issuing of a movement signal is subject to the determination of how much the camera unit should be moved so that the movement signal is issued only if a movement smaller than a given threshold is determined necessary.

3. The apparatus of claim 1, wherein the first action is starting of continuous shooting mode.

4. The apparatus of claim 3, wherein the processor is further configured, during the continuous shooting mode, to detect and automatically reject some or all of the images in which the occlusion is present.

5. The apparatus of claim 1, wherein the first action is delaying image capture.

6. The apparatus of claim 5, wherein the image capture is delayed at most by a given maximum period.

7. The apparatus of claim 6, wherein the maximum period is dynamically defined depending on one or more factors.

8. The apparatus of claim 7, the factors comprising one or more of the following: relative speed of the occluded primary object and of an occluding object; whether other images have already been taken where the occluded primary object was captured; sharpness of earlier image or images where the presently the occluded primary object was visible; estimated exposure period; whether a flash unit is used and if so, optionally also the possible flash rate of the flash unit.

9. The apparatus of claim 1, wherein the apparatus is further configured to receive object information from an auto-focus unit.

10. The apparatus of claim 1, wherein the processor is configured to detect different objects in the received images.

11. The apparatus of claim 10, wherein for detecting of the different objects, the processor is configured to cause the camera unit to: change focusing over entire or most of available focusing range, take images at different focusing, and determine objects at different distances based on how different parts of the images become focused and/or unfocused while the focusing is changed.

12. The apparatus of claim 10, wherein the processor is configured to receive a depth map from the camera unit and use the depth map in determination of the different objects.

13. A method comprising:
receiving images from an image sensor of a camera unit;
monitoring locations of different objects in the received images, wherein the monitoring of locations of different objects involves determining a position of the different objects along an axis extending between the camera unit and the different objects;
determining which if any of the different objects is a primary object that is or should be of interest to a user;
detecting if any primary object becomes occluded by another one of the different objects and responsively to detecting of such occlusion triggering a first action; and
determining, using the determined position of different objects along the axis extending between the camera unit and the different objects, how much the camera unit should be moved laterally to avoid occlusion of primary objects,
wherein the first action comprises issuing a movement signal indicative of a direction to which, and how much, the camera unit should be moved laterally to avoid the occlusion.

14. The method of claim 13, further comprising detecting different objects in the received images.

15. The method of claim 14, wherein for detecting of the different objects, cause the camera unit to: change focusing over entire or most of available focusing range, take images at different focusing, and determine objects at different distances based on how different parts of the images become focused and/or unfocused while the focusing is changed.

16. The method of claim 14, further comprising receiving a depth map from the camera unit and using the depth map in the detecting of the different objects.

17. The apparatus of claim 9, wherein the object information comprises depth information, and wherein the processor is configured to use the received object information as a basis for the monitoring of locations of different objects in the received images.

18. The apparatus of claim 1, wherein the monitoring of locations of different objects comprises determining a position of the different objects in a lateral direction.

19. The apparatus of claim 1, wherein the processor is configured to determine depth of an object by face detection and by calculating a scale of at least one facial feature in an image.

* * * * *